United States Patent Office 3,560,231
Patented Feb. 2, 1971

3,560,231
PREPARATION OF FOAMED ALUMINUM
SALT-FIBER COMPOSITIONS
Earl P. Moore, Jr., Wilmington, Del., assignor to E. I. du
Pont de Nemours and Company, Wilmington, Del.
No Drawing. Continuation-in-part of application Ser. No.
508,391, Nov. 17, 1965, which is a continuation-in-part
of application Ser. No. 457,799, May 21, 1965, now
abandoned. This application Dec. 22, 1967, Ser. No.
692,641
Int. Cl. C04b 21/02, 43/00
U.S. Cl. 106—122   10 Claims

ABSTRACT OF THE DISCLOSURE

Foams of basic aluminum salts and fibrous materials are prepared by mixing from 2 to 40 weight percent of a water dispersible polymeric basic aluminum salt, such as basic aluminum chloride, with water and from 0.02 to 4 percent of an anionic organic acid compound containing from 6 to 18 carbon atoms per acid group, such as sodium lauryl sulfate, and from 2 to 10 parts by weight, based on the weight of basic aluminum salt, of macrofibrous material such as wood pulp and foaming the mixture. The resulting foams dry to form rigid strong low-density structures.

CROSS-REFERENCE TO RELATED APPLICATION

This application is a continuation-in-part of my copending application Ser. No. 508,391, filed Nov. 17, 1965 which in turn was a continuation-in-part of my then copending application Ser. No. 457,799, filed May 21, 1965 now abandoned.

BACKGROUND OF THE INVENTION

This invention relates to methods of preparing fiber-containing foams and more particularly is directed to methods of preparing foamed aluminum salt-fiber mixtures comprising preparing an aqueous composition having a pH of from 3.5 to 7 and comprising water, from 2 to 40 weight percent of water dispersible basic aluminum salt, from 0.02 to 4 weight percent of anionic organic acid compound containing from 6 to 18 carbon atoms per acid group, and from 2 to 10 parts by weight, based on the weight of basic aluminum salt, of macrofibrous material, and foaming the aqueous mixture.

Foam systems known to the art are primarily organic systems such as "soap" foams which are collapsible and unable to carry added materials. Organic polymer foams are stronger but require considerable technology to be used successfully and are limited in their field of use. Inorganic foam system such as disclosed in U.S. Pat. No. 3,041,190 are of limited utility in that they can contain no more than a few percent of alumina at a pH of 6 or above and require an expensive alumina starting material.

I have discovered an essentially inorganic foam system capable of supporting fibrous materials and which can be used to form rigid strong low-density fiber-containing structures. These foam systems can contain large amounts of basic aluminum salts even at a pH up to 6 and are inexpensive and simple to form.

SUMMARY OF THE INVENTION

In summary this invention is directed to methods of preparing aqueous foams of basic aluminum salts and macrofibers by mixing water, from 2 to 40 percent by weight of water dispersible polymeric basic aluminum salt, from 0.02 to 4 percent by weight of anionic organic acid compound containing from 6 to 18 carbon atoms per acid group and from 2 to 10 parts by weight, based on the weight of basic aluminum salt, of macrofibrous material, and expanding the mixture to yield an aqueous basic aluminum salt-macrofiber foam.

The aqueous foams can then be dried to give strong, rigid, low-density structures capable of use in a variety of areas such as thermal and acoustical insulation.

DESCRIPTION OF THE INVENTION

The aqueous foamable compositions of this invention are prepared by merely mixing the polymeric basic aluminum salt with the organic acid compound in an aqueous medium and admixing with this mixture the macrofibrous material. The order of admixture is not critical but it is often most convenient to prepare an aqueous sol of basic aluminum salt, disperse in the sol the organic acid compound and then admix the macrofibrous material.

The basic aluminum compounds suitable for use in this invention are called polymeric because in solution at pH's below 7 the aluminum salts polymerize into molecules approaching colloidal size. These basic aluminum compounds can be represented by the chemical formula $$Al_2(OH)_xZ_y$$

where $x+y=6$ and Z is an acid anion such as chloride, nitrate, sulfate, phosphate, formate, acetate and the like.

Representative of suitable basic aluminum salts is basic aluminum chloride $$Al_2(OH)_5Cl$$

which polymerizes to form compounds such as $$Al_8(OH)_{20}Cl_4$$

Other suitable basic aluminum compounds are basic aluminum formate, basic aluminum acetate, basic aluminum hydroxyacetate, basic aluminum sulfamate, basic aluminum sulfate, basic aluminum nitrate, basic aluminum phosphate and basic aluminum carbonate. These basic aluminum salts can be prepared by ion exchanging or electrolyzing the corresponding aluminum salt; by dissolving aluminum metal in the appropriate aluminum salt or acid solution; or by partially neutralizing the corresponding aluminum salt with a base.

A preferred basic aluminum salt is basic aluminum chloride, also referred to as chlorohydrol and aluminum chlorohydroxide.

The macrofibers suitable for use in this invention can be any material which is of a visible fibrous form. To distinguish these fibers from the fibrous materials in the colloidal range I refer to them as macrofibers. Such materials, for example, as paper pulp, bleached wood pulp, unbleached wood pulp, asbestos fibers, glass fibers, metal fibers, mineral fibers such as rock wool and slag wool and synthetic inorganic fibers such as "Fiberfrax,"® "Superglas"® and Kaowool are satisfactory macrofibers for use in the methods of this invention.

The foam coactants suitable for use in this invention are organic acid compounds which contain 6 to 18 carbon atoms per acid group. When mixed in the above recited proportions with the water dispersible, basic aluminum salt and water these foam coactants permit the preparation of essentially stable, nondraining foams.

Representative of the organic acid compounds which are suitable for use as foam coactants in the compositions of this invention are compounds of the following formulae:

(1)   

wherein $R_1$, $R_2$ and $R_3$ are the same or different and are
(a) hydrogen,
(b) straight chain aliphatic, branched aliphatic or alicyclic, or
(c) any of (b) containing one unsaturation, provided that $R_1$ can be joined with $R_2$ or $R_3$ to form an alicyclic group which can also contain one unsaturation:

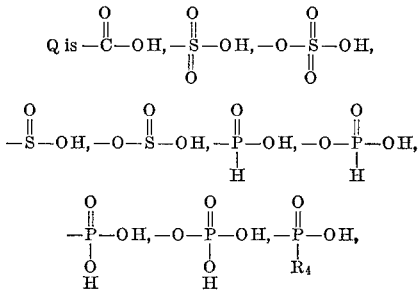

or

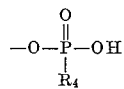

wherein $R_4$ is

with $R_1$, $R_2$ and $R_3$ the same as above, with the limitation that $R_4$ can contain between 1 and 10 carbon atoms; and the sulfate and phosphate esters of (a) esters of the above acids and polyfunctional alcohols or thioalcohols or (b) amides of the above acids and aminoalcohols; with the limitation that the compound must contain between 6 and 18 carbon atoms per acid group.

(2) 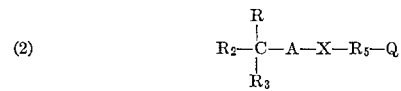

wherein $R_1$, $R_2$ and $R_3$ are as in Formula 1, A is

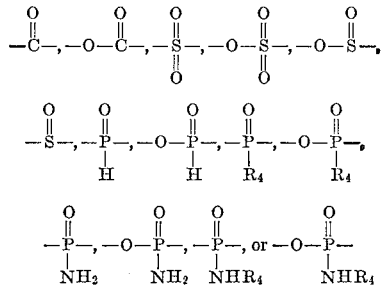

wherein $R_4$ is as in Formula 1; X is —NH, —$NR_4$—, —O—, or —S—, wherein $R_4$ is as in Formula 1; $R_5$ is staright or branched aliphatic or alicyclic of 2 to 10 carbon atoms which can contain up to one hydroxyl, sulfate or phosphate radical per carbon atom; and Q is as in Formula 1; with the limitation that the compound must contain between 6 and 18 carbon atoms per acid group.

The salts and mixtures of the compounds of Formulae 1 and 2 are also effective as foam coactants. Typical salts are the sodium, ammonium, potassium, lithium and organic amine salts.

Where the organic acid is polyfunctional it can contain multiples of the number of carbon atoms as is represented by compounds of the following formula:

(3)      $Q$—$R_6$—$Q_1$ wherein Q and $Q_1$ can be the same or different and can be any of the acid groups of Q in Formula 1; and $R_6$ is straight or branched aliphatic or alicyclic which can contain one unsaturation; with the limitation that $R_6$ must contain from 10 to 36 carbon atoms; amides of the above compounds; sulfate and phosphate acid esters of (a) esters of the above acids and polyfunctional alcohols or thioalcohols; or (b) amides of the above acids and aminoalcohols.

As with the compounds of Formulae 1 and 2, the salts and mixtures of the above compounds are suitable for use as foam coactants.

In some compounds the actual number of carbon atoms will exceed 18 per acid group. This is so because the coactant effect is apparent in compounds of Formula 4 below. It appears in such structures that the aromatic ring structure behaves not as six carbons but more as two carbons in the ratio of total carbons to acid group.

(4) 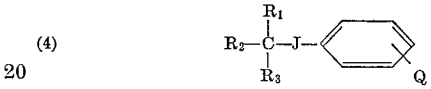

wherein $R_1$, $R_2$ and $R_3$ are as in Formula 1; J is —$CH_2$—, —O—, —S—, —NH—,

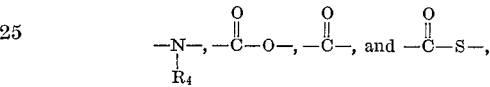

wherein $R_4$ is as in Formula 1; and Q is as in Formula 1.

As with the compounds of Formulae 1, 2, and 3, the salts and mixtures of the above compounds are also effective foam coactants.

Particular acid compounds which have been found to form suitable foams in accordance with this invention include salts of substituted hydrolyzed protein acids such as "Maypon UD" sodium undecylenyl polypeptidate, and "Maypon 4C" potassium cocoyl polypeptidate; straight chain saturated carboxylic acids such as hexanoic, heptanoic, octanoic, nonanoic, decanoic, undecanoic, dodecanoic, tridecanoic, tetradecanoic, pentadecanoic, hexadecanoic, heptadecanoic, octadecanoic, and their mixtures; unsaturated acids such as oleic and 10 undecylenic; mixed branched chain acids such as neo-pentanoic, neo-heptanoic, neo-decanoic, neo-tridecanoic, and "Versatic" 911; substituted acids such as perfluorooctanoic and omega-H-perfluorooctanoic acid; salts of the above acids such as the ammonium, sodium, potassium, lithium and organic amine salts; aromatic compounds such as long-chain alkyl benzene sulfonic acids and their salts, e.g. dodecyl benzene sulfonic acid; carboxylic acids and their salts, e.g. p-octyl benzoic acid; and other compounds including salts of esters of long chain monohydric alcohols and phosphoric or sulfuric acid such as "Duponol"® C, sodium lauryl sulfate, "Duponol"® AM ammonium lauryl sulfate, and "Duponol"® EL triethanol amine lauryl sulfate; and such compounds as cyclohexyl butyric acid; 10-hydroxydecanoic acid; "Maprosyl" 30 sodium lauroyl sarcosinate; 9-ethyl-eicosan-1,20-dioic acid; sodium pentachlorophenate; "Zonyl"® mixed S–13 fluoroalkyl phosphates; dioctyl sodium sulfosuccinate; chlorendic acid; and "Zelec"® UN fatty alcohol phosphate.

Preferred foam coactants for reasons of most desirable foam consistency are octanoic, decanoic, nonanoic, undecanoic, dodecanoic, tridecanoic, tetradecanoic, pentadecanoic, 10-undecylenic, neodecanoic, neotridecanoic, p-octylbenzoic and cyclohexyl butyric acids and their salts, long-chain benzene sulfonic acids and their salts, sodium lauroyl sarcosinate, dioctyl sodium sulfosuccinate, fluoroalkyl phosphates, "Maypon UD" sodium undecylenyl polypeptidate, "Maypon 4C" potassium cocoyl polypeptidate, and esters of long-chain monohydric alcohols and sulfuric or phosphoric acids and their salts. The "long-chain" designation as it is used above is intended to mean 6 or more carbon atoms, and where substituted compounds are mentioned the substituents are not limiting or critical either as to kind or number.

The coaction between the above acid compounds, the water dispersible, basic aluminum salt and the macrofibers in an aqueous composition is not fully understood, however, some interaction between the components permits for generation of foams which can be dried to structures possessing exceptional properties. It is believed that the fibers in these structures are bonded at points of contact and near contact by the basic aluminum salt.

The amount of basic aluminum salt used in the aqueous compositions of this invention ranges generally from about 2 to about 40 percent by weight of the total composition minus macrofibers. Amounts of aluminum salt below 2 percent can be used but tend to cause undesirable reduction in foamability of the aqueous compositions and at higher macrofiber-to-aluminum salt ratios may be inadequate to achieve the desired fiber bonding.

Similarly, amounts of aluminum salt in excess of 40 percent can be used and amounts of from 40 to 50 percent are only a little less desirable than amounts below 40 percent. Amounts of more than 50 percent tend to make the aqueous compositions too thick to foam and contribute to an undesirable weakness in the dry foamed structure at lower macrofiber-to-aluminum salt ratios.

Preferred amounts of basic aluminum salt are from about 5 to about 30 percent by weight of the total composition. Such aluminum salt concentrations offer the most desirable consistency in the aqueous compositions for ease of admixture and foaming.

The amount of macrofibers used will range generally from about 2 to about 10 parts by weight based on the basic aluminum salt. Greater or lesser amounts of macrofibers can be used but the former tends to increase the density of the dried foam structures to a greater degree than is desirable and the latter tends to make the dried foam structure undesirably weak. However, for purposes which do not require the lower densities or greater strength, such compositions may be suitable.

Preferred amounts of macrofibers range from about 3 to about 6 parts by weight based on the basic aluminum salt. Such macrofiber concentrations contribute to a most desirable consistency of the aqueous foamable compositions.

As stated previously, the amount of foam coactant used will vary from 0.2 to 4 percent by weight. The amount is determined by the amount of basic aluminum salt that is used. The organic acid compound is used in amounts of from 1 to 10 percent by weight based on the weight of the aluminum salt used. Amounts of organic acid compound of less than 1 percent, based on the weight of aluminum salt, can be used if desired but the quality of the foam will be somewhat reduced. Amounts of organic acid compound in excess of 10 percent, based on the weight of basic aluminum salt, can be used without any marked decrease in foaming effectiveness. However, since there is little apparent benefit derived from the use of the larger amounts, such use is considered superfluous.

As the ratio of components permit for wide variance in the amounts of each component which can be present, it is possible to obtain an aqueous composition with a high or low pH. While such compositions can be used as is to produce satisfactory foamed structures, it is preferred to adjust the pH to a range of about 3.5 to 7 prior to foaming, and for best results it is preferred that the pH be in the range of 4.5 to 6.0. It is usually desirable to make the pH adjustment initially on the basic aluminum salt sol by either bringing it to a neutral pH or to that pH which is desired for the aqueous composition.

The pH adjustment can be made by adding dilute alkalis such as ammonium hydroxide, sodium hydroxide, potassium hydroxide, or lithium hydroxide as required. Aqueous solutions of water soluble organic amines such as triethanolamine can also be used. An alternate means of adjusting the pH of the aluminum salt sol is ion exchange or partial deionization.

The aqueous foamable compositions can be converted into foams by any of the many suitable means well known to the art. For example, the compositions can be foamed mechanically with vigorous agitation which can be obtained from beater type mixers, blender type mixers, or commercial foam producers.

Additives can be used to enhance the compositions of this invention as desired. For example, colorants, fillers, or binders such as hydroxyethylcellulose can be used in the aqueous compositions for such advantages as they impart, as can organic binders such as polyvinyl acetate, phenolformaldehyde resins, ureaformaldehyde resins and melamineformaldehyde resins. Of particular interest as additives in foamed fiberglass systems are phenol-formaldehyde resins. The dried foamed structures can be used as is or for example they can be impregnated with resins and then compressed. Other additives will be obvious to those skilled in the art.

The dried foamed structures of this invention are strong, rigid, low density, porous compositions which have excellent absorbent properties. They can be used in a variety of ways such as for gas filtration, as shock resistant packaging material, for acoustical insulation, thermal insulation, paper mulch and many other uses. The ratios of constituents can be varied to obtain structures which posses particularly desired properties. For example, by varying the macrofiber-to-aluminum salt ratio; the overall aluminum salt concentration; and the water content; structures can be produced with bulk densities ranging from less than 0.5 lb. per cubic foot to more than 5 lb. per cubic foot. Simultaneously the fireproof properties, strength, rigidity and resiliency can be altered to almost any desired combination of properties. By maintaining a macrofiber-to-aluminum salt ratio of between about 3:1 and 6:1 at an overall aluminum salt concentration of between 5 and 30%, structures can be prepared which exhibit the greatest measure of resiliency, good strength, and good thermal insulation properties.

In order that this invention can be better understood the following illustrative examples are given wherein parts and percentages are by weight unless otherwise noted.

EXAMPLE 1

One hundred parts of a 50% solution of a basic aluminum chloride sold by the Reheis Chemical Co. as "Chlorhydrol"® is diluted with 150 parts water and the pH is adjusted to 5.00 with dilute ammonium hydroxide solution in an osterizer blender. The mixture is transferred to a "Hobart" mixer kettle and stirred at a moderate speed as 450 parts chopped "Fiberfrax"® sold by the Carborundum Co. is added. While the "Fiberfrax"® is being added 200 parts of water and a portion of 2.5 parts of "Duponol"® C, sodium lauryl sulfate, in 10 parts of water are added to give partial foaming and to aid in dispersion of the fiber. After the remainder of the "Duponol"® C has been added the agitation is switched to high speed. A full kettle of foam is developed and is dried at 100° C. in an oven in the form of a block to give a homogeneous composition of a density of 3 lb./cu. ft.

EXAMPLE 2

Eighty parts of a 50% solution of basic aluminum chloride is diluted with 120 parts water and the pH is adjusted to 5.25 with dilute potassium hydroxide solution in an Osterizer blender. The solution is then transferred to a "Hobart" mixer kettle and is stirred at moderate speed with a wire beater as 480 parts of wet unbleached kraft wood pulp (160 parts dry basis) is added. To this mixture is added a portion of 1.0 part of ammonium decanoate in 10 parts of water to give partial foaming and aid in dispersion of the wood fiber. The remainder of the ammonium decanoate is then added and the mixture is agitated at high speed for 10 minutes until maximum stiffness is developed.

A block of the foam is dried in an oven at 100° C. for 16 hrs. to give a lightweight, fireproof composition which is an excellent low temperature insulating material.

EXAMPLE 3

Three hundred and twenty parts of a 50% "Chlorhydrol"® solution is diluted with 480 parts water to give a solution of 20 parts solids. With stirring, washed "Rexyn"® 201 (OH) basic ion exchange resin is added to bring the pH to 6.00. The solution is placed in a "Hobart" mixer kettle and stirred at a moderate speed as 900 parts "Kaowool"® fiber sold by the Babcock and Wilcox Co. is added. While the fiber is being added, 100 parts more water and a portion of 6.4 parts octanoic acid in 25 parts ethanol are added to give partial foaming and to aid in dispersion of the fiber. After the remainder of the octanoic acid has been added the agitation is switched to high speed and the mixture is beaten until there is no further increase in volume.

A fluffy, soft, homogeneous product with a density of 2.4 lb./cu. ft. is obtained on drying in a block shape at 100° C.

I claim:

1. An aqueous composition for producing low density foams having a pH of from 3.5 to 6 and containing as essential ingredients water, from 2 to 40 weight percent of a basic aluminum salt having the chemical formula $$Al_2(OH)_xZ_y$$

wherein $x+y=6$ and Z is an acid anion, and from 2.5 to 5 weight percent based on the weight of basic aluminum salts of an anionic organic acid compound containing from 6 to 18 carbon atoms per acid group selected from the group consisting of hydrolyzed protein acids, straight chain saturated carboxylic acids, unsaturated carboxylic acids, fluorinated carboxylic acids, aromatic sulfonic acids, aromatic carboxylic acids, salts of these acids, and salts of esters of long chain monohydric alcohols and phosphoric or sulfuric acid, the compositions also containing from about 4 to 9 parts by weight of macrofibers selected from the group consisting of paper pulp, bleached wood pulp, unbleached wood pulp, mineral fibers, and synthetic inorganic fibers selected from the group consisting of glass fibers, metal fibers and ceramic fibers, based on the weight of basic aluminum salts.

2. An aqueous composition of claim 1 in which the organic acid compound is selected from the group consisting of perfluorooctanoic acid, omega-H-perfluorooctanoic acid, octanoic acid, nonanoic acid, decanoic acid, undecanoic acid, dodecanoic acid, tridecanoic acid, tetradecanoic acid, pentadecanoic acid, 10-undecylenic acid, p-octyl benzoic acid, dodecyl benzene sulfonic acid, cyclohexylbutyric acid, mixtures of the acids, their ammonium, sodium, potassium, lithium and organic amine salts, ammonium, sodium, potassium, lithium and the organic amine salts of substituted hydrolyzed protein acids, dioctyl sodium sulfosuccinate, sodium lauroyl sarcosinate, fluoroalkyl phosphates, and ammonium, sodium, potassium, lithium and organic amine salts of esters of long-chain monohydride alcohols and sulfuric and phosphoric acid.

3. A dried foamed structure consisting essentially of one part of a basic aluminum salt having the formula $$Al_2(OH)_xZ_y$$

wherein $x+y=6$ and Z is an acid anion, from 2.5 to 5 weight percent based on the weight of basic aluminum salts of organic acid compound containing 6 to 18 carbon atoms per acid group selected from the group consisting of hydrolyzed protein acids, straight chain saturated carboxylic acids, unsaturated carboxylic acids, fluorinated carboxylic acids, aromatic sulfonic acids, aromatic carboxylic acids, salts of these acids, and salts of esters of long chain monohydric alcohols and phosphoric or sulfuric acid, and from about 4 to 9 parts of macrofibers selected from the group consisting of paper pulp, bleached wood pulp, unbleached wood pulp, mineral fibers, and synthetic inorganic fibers selected from the group consisting of glass fibers, metal fibers and ceramic fibers, said macrofibers being bonded at points of contact and near contact by the basic aluminum salt.

4. A method of producing foamed macrofiber structures having low bulk density, comprising admixing with water from 2 to 40 weight percent of a basic aluminum salt having the chemical formula $$Al_2(OH)_xZ_y$$

wherein $x+y=6$ and Z is an acid anion, adjusting the pH of the resultant sol to between 3.5 and 6 and mixing with the sol from 2.5 to 5 weight percent based on the weight of the basic aluminum salt of an organic acid compound containing 6 to 18 carbon atoms per acid group selected from the group consisting of hydrolyzed protein acids, straight chain saturated carboxylic acids, unsaturated carboxylic acids, fluorinated carboxylic acids, aromatic sulfonic acids, aromatic carboxylic acids, salts of these acids, and salts of esters of long chain monohydric alcohols and phosphoric or sulfuric acid, and then admixing from 4 to 9 parts by weight of macrofibers selected from the group consisting of paper pulp, bleached wood pulp, unbleached wood pulp, mineral fibers, and synthetic inorganic fibers selected from the group consisting of glass fibers, metal fibers and ceramic fibers based on the weight of the basic aluminum salt, and forming the mixture and drying the resultant foam at a temperature of about 100° C.

5. A method of claim 4 wherein the basic aluminum salt is basic aluminum chloride.

6. A method of claim 4 wherein the sol of basic aluminum salt contains from 5 to 30 percent by weight of basic aluminum salt.

7. A method of claim 4 wherein the organic acid compound is selected from the group consisting of perfluorooctanoic acid, omega-H-perfluorooctanoic acid, octanoic acid, nonanoic acid, decanoic acid, undecanoic acid, dodecanoic acid, tridecanoic acid, tetradecanoic acid, pentadecanoic acid, 10-undecylenic acid, p-octyl benzoic acid, dodecyl benzene sulfonic acid, cyclohexylbutyric acid, mixtures of the acids, their ammonium, sodium, potassium, lithium and organic amine salts, ammonium, sodium, potassium, lithium and the organic amine salts of substituted hydrolyzed protein acids, dioctyl sodium sulfosuccinate, sodium lauroyl sarcosinate, fluoroalkyl phosphates, and ammonium, sodium, potassium, lithium and organic amine salts of esters of long-chain monohydric alcohols and sulfuric acid and phosphoric acid.

8. A method of claim 7 wherein the basic aluminum salt is basic aluminum chloride.

9. A method of claim 7 wherein the sol of basic aluminum salt contains from 5 to 30 percent by weight of basic aluminum salt.

10. A method of claim 9 wherein the basic aluminum salt is basic aluminum chloride.

References Cited

UNITED STATES PATENTS

| 2,584,082 | 1/1952 | Macalusco | 106—122 |
| 2,915,475 | 12/1959 | Bugosh | 252—313 |
| 3,041,190 | 6/1962 | Griffith et al. | 106—40 |

JULIUS FROME, Primary Examiner

J. H. MILLER, Assistant Examiner

U.S. Cl. X.R.

264—42